(No Model.)
R. WILSON.
MILLSTONE DRESS.
No. 319,652. Patented June 9, 1885.
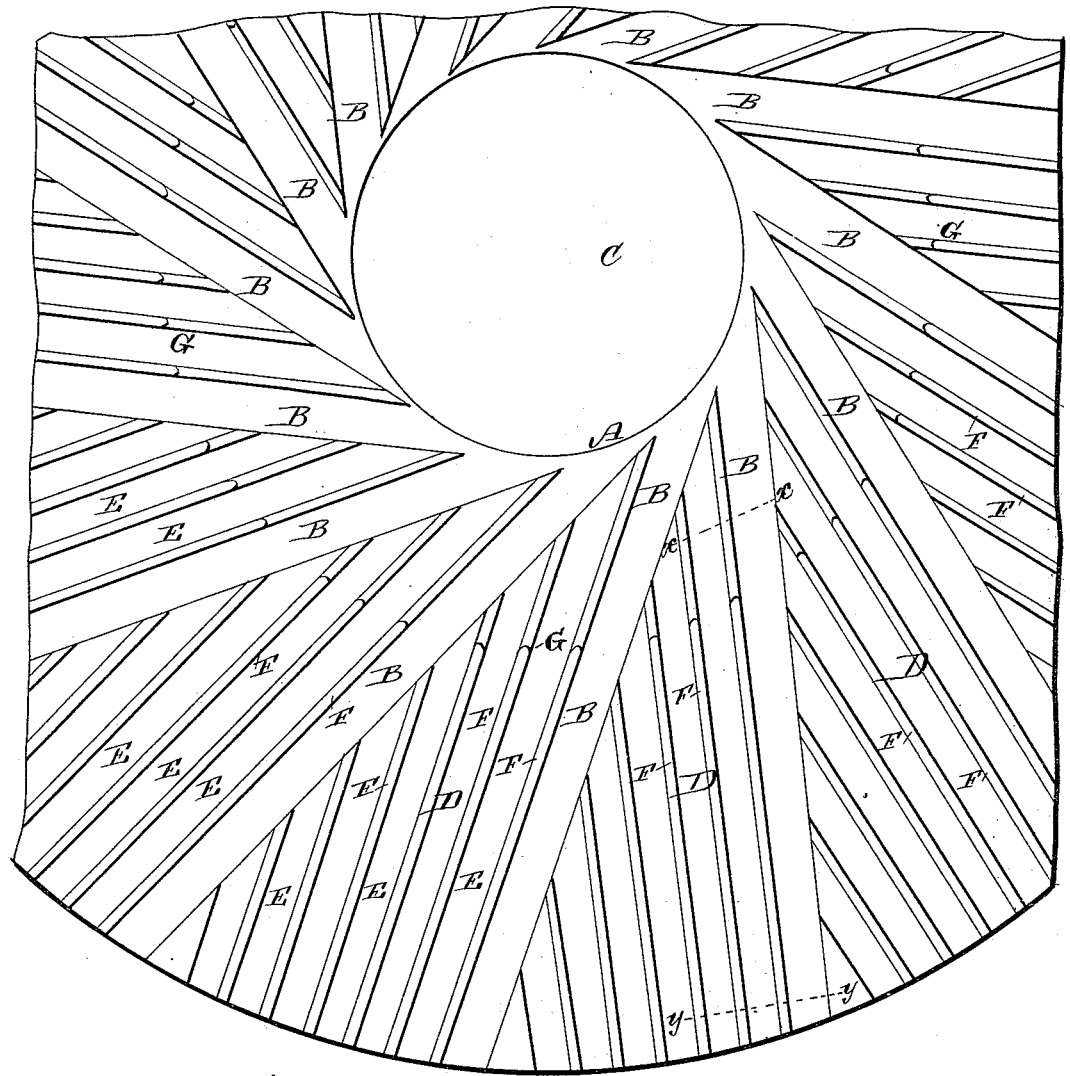
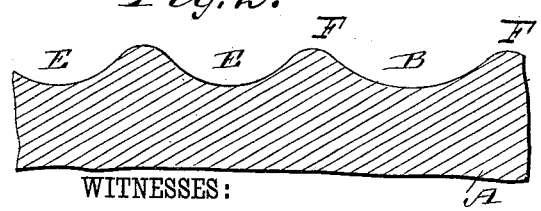
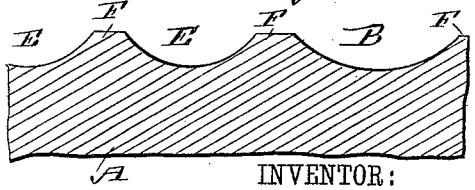
WITNESSES:
Theo. G. Hoster
C. Sedgwick
INVENTOR:
R. Wilson
BY Munn & Co.
ATTORNEYS.

UNITED STATES PATENT OFFICE.

ROBERT WILSON, OF GREENUP, KENTUCKY.

MILLSTONE-DRESS.

SPECIFICATION forming part of Letters Patent No. 319,652, dated June 9, 1885.

Application filed March 14, 1885. (No model.)

*To all whom it may concern:*

Be it known that I, ROBERT WILSON, of Greenup, county of Greenup, Kentucky, have invented a new and Improved Millstone-Dress, of which the following is a full, clear and exact description.

This invention relates to certain new and useful improvements in millstone-dresses; and it has for its object to provide a dress whereby the bran will not be cut or torn, and the stones are kept comparatively cool.

The invention consists of a millstone provided with furrows and lands, the latter having their tops rounded from the inner ends to a circle surrounding the eye, and having their remaining portions made flat.

Reference is to be had to the accompanying drawings, forming part of this specification, in which similar letters of reference indicate corresponding parts in all the figures.

Figure 1 is a face view of a millstone provided with my improved dress, parts being broken out. Fig. 2 is an enlarged cross-sectional view of the same on the line $x$ $x$, Fig. 1. Fig. 3 is an enlarged cross-sectional view of the same on the line $y$ $y$, Fig. 1.

The millstone A is provided with the draft-furrows B, extending from the eye C to the skirt or periphery, and arranged tangentially to the eye. Thus a series of triangular fields, D, are formed, each of which is bounded by two draft-furrows, B, and part of the skirt, and one of the two sides of each triangle formed by the furrows B is longer than the other.

In the fields D the grinding-furrows E are cut, which are parallel with the short sides of the triangular fields, and all the grinding-furrows in each field are parallel. The grooves or furrows E have a segmental or rounded bottom, and between them the narrow lands F are formed. The lands F have their tops rounded from their inner ends to a circle, G, surrounding the eye, and the remaining parts of the lands have flat tops, as is shown in Figs. 1 and 3. The inner ends of the lands have their tops rounded, so as to not cut and tear the bran.

The furrows occupy seven-eighths of the stone and the lands but one-eighth, and thus the stone runs very cool.

As the furrows are half-oval-shaped or rounded, the lands or grinding-surfaces are protected from breaking down.

The stock is distributed symmetrically, and the friction is reduced very much.

The dress can be produced by means of an emery-wheel, and the expensive and laborious picking is not required.

A millstone having my improved dressing requires much less power than other stones.

Having thus described my invention, I claim as new and desire to secure by Letters Patent—

A millstone provided with furrows and lands F, the latter having their tops rounded from their inner ends to a circle around the eye, and having their remaining parts made flat, substantially as herein shown and described.

ROBERT WILSON.

Witnesses:
ROBERT E. L. WILSON,
WILLIAM G. WILSON.